(12) United States Patent
Price et al.

(10) Patent No.: US 7,358,890 B2
(45) Date of Patent: Apr. 15, 2008

(54) MILLIMETRE-WAVE ILLUMINATION SOURCE

(75) Inventors: Sean Price, Malvern (GB); Peter Russell Coward, Malvern (GB); Neil Anthony Salmon, Malvern (GB)

(73) Assignee: Qinetiq Limited (GB)

( * ) Notice: Subject to any disclaimer, the term of this patent is extended or adjusted under 35 U.S.C. 154(b) by 75 days.

(21) Appl. No.: 10/513,545

(22) PCT Filed: May 1, 2003

(86) PCT No.: PCT/GB03/01886

§ 371 (c)(1),
(2), (4) Date: Nov. 4, 2004

(87) PCT Pub. No.: WO03/098741

PCT Pub. Date: Nov. 27, 2003

(65) Prior Publication Data

US 2005/0168376 A1   Aug. 4, 2005

(30) Foreign Application Priority Data

May 16, 2002  (GB) ................................. 0211161.5

(51) Int. Cl.
| | |
|---|---|
| *G01S 13/88* | (2006.01) |
| *G01S 7/35* | (2006.01) |
| *G01S 13/89* | (2006.01) |
| *H01Q 21/00* | (2006.01) |
| *G01S 13/00* | (2006.01) |
| *H01Q 21/06* | (2006.01) |
| *H01Q 13/18* | (2006.01) |
| *G01V 8/00* | (2006.01) |

(52) U.S. Cl. .................. 342/82; 342/175; 342/176; 342/179; 342/368; 342/376

(58) Field of Classification Search .................. 342/21, 342/22, 27, 28, 59, 61–68, 73, 74, 82–103, 342/147, 158, 175, 176, 179, 192–197, 368, 342/376; 343/721, 767–786
See application file for complete search history.

(56) References Cited

U.S. PATENT DOCUMENTS 3,683,379 A * 8/1972 Saddler et al. ............... 343/721

(Continued)

FOREIGN PATENT DOCUMENTS

GB         1247270         9/1971

(Continued)

*Primary Examiner*—Bernarr E. Gregory
(74) *Attorney, Agent, or Firm*—McDonnell Boehnen Hulbert & Berghoff LLP

(57) ABSTRACT

An illumination source of predominantly non-directional and incoherent millimeter-wave radiation for illuminating an area for passive millimeter-wave imaging comprises a container with at least a partly reflective internal surface and a plurality of exit apertures and a primary source of millimeter-wave radiation for emitting millimeter-wave radiation into the container. The primary source and the container are arranged so that a proportion of the millimeter-wave radiation emitted by the source undergoes reflection within the container before being emitted through the apertures, such that the different paths lengths are at least equal to the coherence length of the radiation. This is facilitated if the bandwidth of the radiation is preferably at least 1 GHz. The container may be a box in which a waveguide is used to couple radiation from the primary source into the box. Alternatively, the container may be formed from a mesh and the plurality of holes is provided by the holes in the mesh.

31 Claims, 4 Drawing Sheets

U.S. PATENT DOCUMENTS 3,713,156 A * 1/1973 Pothier ................... 342/22
3,824,593 A * 7/1974 Baird ..................... 342/179
4,187,507 A * 2/1980 Crane et al. ............. 342/376
4,630,053 A * 12/1986 Green et al. ............. 342/376
4,746,926 A   5/1988 Stern et al.
5,047,783 A * 9/1991 Hugenin .................. 342/179
5,073,782 A * 12/1991 Huguenin et al. ......... 342/179
5,173,714 A   12/1992 Tsukada et al.
5,227,800 A * 7/1993 Huguenin et al. ......... 342/179
5,680,139 A   10/1997 Moore et al.

FOREIGN PATENT DOCUMENTS

| | | |
|---|---|---|
| GB | 2 208 969 | 4/1989 |
| GB | 2 233 502 | 1/1991 |
| WO | WO 90/07130 | 6/1990 |

* cited by examiner

MILLIMETRE-WAVE ILLUMINATION SOURCE

BACKGROUND OF THE INVENTION

1. Field of the Invention

The present invention relates to an illumination source for passive millimeter-wave imaging.

2. Description of the Art

Many available imagers for security applications can produce images which enable an operator to readily detect concealed weapons such as guns and knives, which are hidden for example within a person's clothing or baggage. Clothing and baggage materials are virtually transparent to at least some of these known imagers and this may be advantageous when metallic objects are solely of interest, since they will not be obscured by non-metallic material.

This does mean, however, that such imagers are not capable of providing recognisable images of passive non-metallic objects such as plastics, ceramics and explosives, which nowadays are often of more interest.

Millimeter-wave imaging addresses this problem. In outdoor passive millimeter-wave imaging high contrast is provided in the generated image by cold sky illumination. Depending on the geometry of the viewed scene, materials such as metals can reflect this illumination towards the imager, appearing cold and exhibiting a high contrast against the generally warm background. In addition, however, it is possible to use millimeter-wave imaging for detecting passive non-metallic objects, and this technique also allows the remote and covert scanning of suspects.

Passive millimeter-wave imaging can be accomplished indoors but the lack of sky illumination means that the main source of contrast is now the actual temperature difference between objects. This contrast will be of the order of 10K, which is an order of magnitude less than what can be expected in outdoor imagery.

Another alternative is to use an artificial source of millimeter-wave radiation, to illuminate the area being imaged in order to improve the contrast in the generated image. The relatively long wavelength of millimeter-wave radiation means that many reflections from visibly rough or dull surfaces are specular in nature in the millimeter-wave portion of the electromagnetic spectrum, i.e. many visibly rough or dull surfaces behave similarly to a mirror to millimeter-wave radiation. This effect is noticeable when a person being imaged is illuminated from a small source. In this situation the person does not appear uniformly warm in the generated image, but instead warm glints appear on the body of the person where specular reflection of the source from the body is incident on the aperture of the imager. This effect makes the generated image difficult to interpret in real time, particularly in real time.

This problem can be overcome by locating large areas of radar absorbent material, for example over the walls, ceiling and floor of an indoor area in which passive millimeter-wave imaging is to be done and heating or cooling the radar absorbent material to a temperature that is different from the ambient temperature of the objects in the indoor area that are being imaged. Alternatively, large area portable panels of heated or cooled radar absorbent material can be set up in the indoor area in which imaging is to take place. This approach requires a lot of energy to heat or cool the large area of radar absorbent material and does not lend itself to portability.

It would therefore be desirable to provide a non-directional illumination source of millimeter-wave radiation, where the radiation also has a low degree of coherence, or no coherence, and which has relatively low power consumption. It would also be desirable to provide such an illumination source in the form of a uniformly radiating surface. Ideally the radiating surface would appear to have the same brightness at all angles of observation, so approximating a black body radiator.

SUMMARY OF THE INVENTION

In a first aspect the present invention provides an illumination source of millimeter-wave radiation for illuminating an area for passive millimeter-wave imaging, the source comprising a container with at least a part of its interior formed from reflective material and having a plurality of exit apertures; and a primary source of millimeter-wave radiation for emitting millimeter-wave radiation into the container;

wherein the primary source and the container are arranged so that at least a portion of the millimeter-wave radiation emitted by the primary source undergoes reflection within the container and each said aperture receives radiation from the source via at least two paths of different respective lengths.

Preferably the said at least two paths differ by more than the coherence length of said radiation, and since coherence length is dependent on bandwidth (a function of propagation speed over bandwidth), preferably the radiation has a bandwidth of at least 1 GHz. This provides a correspondingly low coherence length of around 30 cm, and higher frequencies give correspondingly shorter coherence lengths.

Indeed, from another viewpoint, the requirement that the said at least two paths differ by more than the coherence length of said radiation is most easily met when the radiation has a large bandwidth. Furthermore, the millimeter-wave imager that would be looking at the illuminated scene is likely to have a bandwidth in the GHz range, and the illuminating source would need to cover all of this bandwidth in order to make best use of the sensitivity of the imager.

Furthermore, using a wide bandwidth is one way of reducing the chances of dielectric layers not being visible due to interference effects.

Accordingly in a second aspect the invention provides an illumination source of millimeter-wave radiation for illuminating an area for passive millimeter-wave imaging, the source comprising a container with at least a part of its interior formed from reflective material and having a plurality of exit apertures, and a primary source of millimeter-wave radiation for emitting millimeter-wave radiation with a bandwidth of at least 1 GHz into the container;

wherein the primary source and the container are arranged so that at least a portion of the millimeter-wave radiation emitted by the primary source undergoes reflection within the container before being emitted through the apertures.

Preferably the bandwidth is at least 2 GHz, more preferably at least 10 GHz, and in some applications the bandwidth is 40 GHz or more. Relevant sources of radiation might be noise sources or amplifiers that amplify a noise source or load.

The source may be located entirely within the container, which provides a more self-contained arrangement. However, care then needs to be taken to ensure oscillation of the system cannot occur, for example if some of the radiation inside the container is fed back to the source via a leak in the structure (such as at a waveguide join) and re-amplified, which could well give rise to a change in the source output and bandwidth and adversely affect the overall performance of the panel. One way of preventing radiation getting to the source components is to enclose them separately within the container with only the radiating aperture accessible.

One advantage of providing a source completely within the container is that it is then much easier to tile a plurality of suitably shaped containers together to synthesise a larger illumination source without significant gaps.

Alternatively, the source or parts thereof may be outside the container and coupled thereto e.g. by a waveguide, a horn or a diffusive device such as a leaky waveguide. A diffusive device has the benefit of facilitating spreading of the primary input radiation to more than one location within the container. An alternative form of diffusive device would be smaller version of the overall panel itself contained within the container. Preferably the device is selected such that it enables control of the level of radiation fed into the container.

The primary source is preferably arranged to act essentially as a point source, for example by forming an input aperture to the volume of the container (whether from outside the container or from a source wholly within the container) which has a size approximating to the operating wavelength of the source.

Preferably the apertures have a width approximating to half the operating wavelength of the illumination source, so that the radiation emitted from the apertures spreads out with a solid angle approaching $2\pi$ steradians. As noted later, the beam patterns depend on polarisation and the direction of observation, resulting In different E and H plane patterns, according to standard aperture theory. Care needs to be taken in selecting the hole dimension(s) insofar as when the dimension is small relative to wavelength the transmission through the hole varies as a high power of the dimension. This means that while reducing hole dimension(s) may improve the radiation pattern, in particular increasing its width or angular range, the apparent or observed millimeter-wave temperature of the radiating surface (i.e. the surface incorporating the apertures) may fall to an undesired extent.

The apertures may all have the same shape and size, or the shape and/or size may vary (for example between 2 or 3 different discrete shapes or sizes, or there may be a continuous variation in shape/size across the panel) to alter the overall pattern of radiation from the radiating surface.

In one embodiment the container is a box and a waveguide is used to couple millimeter-wave radiation from the primary source into the box. In another embodiment at least part of the container is formed from a mesh and the plurality of holes is provided by the plurality of holes in the mesh.

The reflections that the radiation from the primary source undergoes before being emitted through the apertures in the container mean that some radiation from the source travels further within the container than other radiation before being radiated at a particular aperture. This helps to decrease the coherence of the radiation emitted from the panel as a whole and from adjacent apertures in particular. Preferably over 50%, more preferably at least 75% and even more preferably at least 90% of the millimeter-wave radiation emitted by the primary source undergoes reflection within the container before it is emitted through the apertures.

The incoherence of the emitted radiation may be further promoted where at least a part of the interior of the container is formed from rough reflective material so that incident light on the rough reflecting material is reflected in different directions. In this context "rough reflective material" means reflective material with discontinuities of a size approximating or greater than the wavelength of the radiation. Also, by making the apertures small the emitted radiation pattern is broad, and therefore relatively non-directional (although it still has a definite maximum intensity direction).

Incoherence and non-directionality of the radiation from the apertures are two of the requirements noted above for good indoor illumination for passive millimeter-wave imaging and they can be achieved by the present invention while consuming much less power than is required in the heating or cooling of large areas of radar absorbent material.

It is also very desirable that the power of the millimeter-wave radiation emitted from each aperture in the container is similar so as to provide a uniformly radiating surface when viewed with a relatively low resolution (so as not to resolve individual apertures). This can be achieved in a variety of ways, such as by the careful arrangement of the pattern of the apertures formed in the container, by the use of at least one reflective baffle and/or at least one region of millimeter-wave absorbing material within the-container or by covering the apertures emitting the highest power millimeter-wave radiation by a partially reflective dielectric element or by a partially absorbing material.

In general, uniform radiation is assisted considerably by ensuring that the emitted radiation has undergone many reflections within the container, for example by making the internal surface of the radiating surface more highly reflective and by careful control of aperture size and shape.

In addition the polarisation of the radiation emitted by the primary source relative to the radiating surface can be important. The E and H plane beam patterns of the apertures have an effect within the box as well, and it has been shown to be desirable to choose that polarisation that is less likely to be directly radiated, i.e. the one that corresponds to the H plane of the aperture, and is parallel to the plane of the radiating surface rather than perpendicular to it.

A further desirable feature would be that the radiating surface appears to have the same brightness at all angles of observation, so approximating a black body radiator. To this end, as will be explained in greater detail later, a low loss dielectric material may be located at or immediately adjacent the apertures to intercept radiation passing through the apertures. Conveniently the dielectric material may take the form of a sheet of material over the exterior of the radiating surface, but other arrangements are possible.

A further use of a sheet of dielectric material over the radiating surface is to control the direction of the radiation leaving the apertures. For example, the sheet may be wedge-shaped so as to refract the main radiation direction away from the normal; or the sheet may be stepped to act as a sort of Fresnel lens, for focusing or redirecting the radiation from the apertures depending on the pattern of the steps (e.g. a circular stepped pattern could be used for focusing as in a Fresnel lens, but a linear stepped pattern could act as a wedge). In each case the sheet has a non-uniform thickness, and is preferable placed on the outside of the radiating surface.

Sources of GHz frequency radiation comprising a container with at least a part of its interior formed from reflective material and having a plurality of exit apertures; and a primary source of millimeter-wave radiation for emitting millimeter-wave radiation into the container, in which the primary source and the container are arranged so that at least a portion of the millimeter-wave radiation emitted by the primary source undergoes reflection within the container before being emitted through the apertures are known. For example, UK Patent Application GB 2 233 502 A (Arimura Giken KK) discloses slot antennae in which input radiation energy at 12 GHz for one polarisation and 14 GHz for the orthogonal polarisation is reflected into a rectangular waveguide having a slotted face, residual radiation being absorbed at the far end of the guide rather than being available for reflection. The description refers to power radiating from the slots "in equiphase", and to arranging the slot spacings according to the operative wavelength. There is a related disclosure GB 2 208 969 A (also Arimura Giken KK).

By contrast, the present invention is concerned with the provision of a broadband millimeter-wave illumination source and/or the provision of a source which radiates predominantly incoherent illumination.

The present invention extends to an array of illumination sources according to the first or second aspects of the invention, and to an imaging system comprising a millimeter-wave imager for imaging a predetermined region, and an array of illumination sources according to the first or second aspects of the invention arranged to illuminate said region.

In certain instances, it may merely be necessary to arrange the illumination sources either side of the region, for example in two opposed straight lines. However, unless the radiation from each source is uniform, some sources will contribute more radiation to the local region than others. Therefore, when the sources have a direction in which there is a maximum amount of radiated energy (the principal radiation direction) it is preferred to arrange the sources with their principal radiation directions generally directed towards the same more localised region. This can be done by inclining the sources relative to each other, and/or by arranging that the radiation from at least one source is refracted or steered as it leaves the radiating surface, for example as previously indicated by providing a dielectric wedge or linear stepped pattern on the radiating surface, for example. Additionally or alternatively, the radiation from one or more radiating surfaces may be "focused" for example by providing a dielectric layer thereon having a circular stepped pattern much as in a Fresnel lens.

The present invention will now be described by way of example only with reference to the accompanying figures in which:

DESCRIPTION OF A PREFERRED EMBODIMENT

Figure 1:
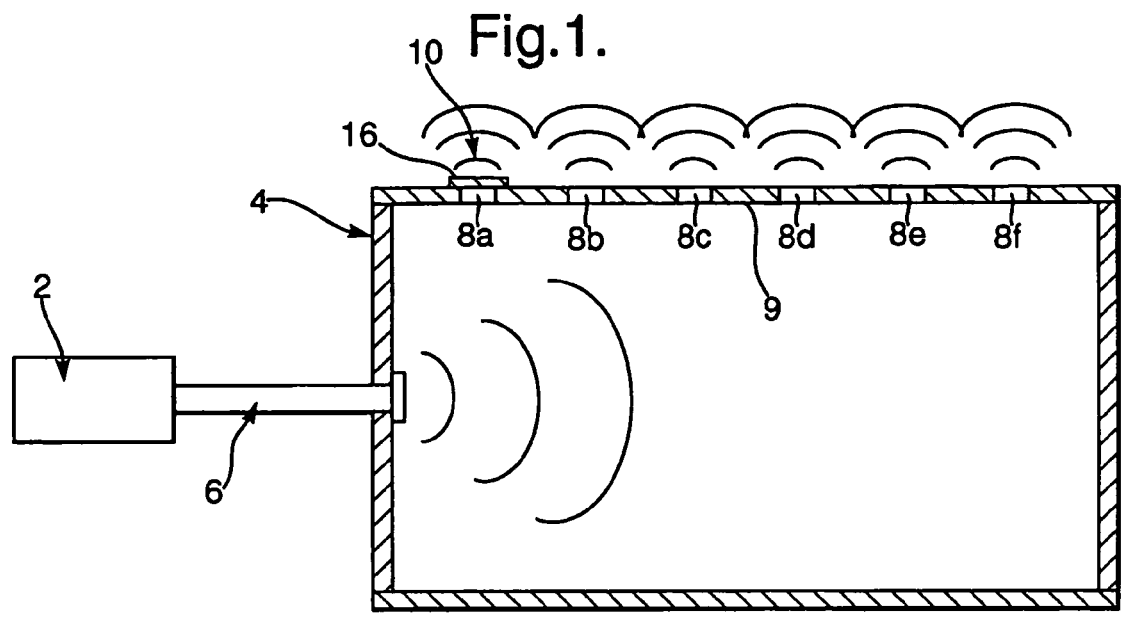
FIG. 1 shows a cross-section through a first embodiment of a source for passive millimeter-wave imaging according to the present invention.

In the arrangement in FIG. 1 millimeter-wave electromagnetic radiation is generated in a millimeter-wave source 2, such as an amplified noise source and is coupled into a metal box 4 using waveguide 6. The source 2 will generate millimeter-wave radiation associated with a temperature which is either much higher or much lower than the ambient temperature of the objects in the area being imaged. In this way higher contrast can be introduced into the generated image. The metal box 4 has an internal reflective surface which may, for example, have a reflectivity of 0.5 or greater at the operating wavelength. At least one side of the box 9 is formed with an array of through holes or apertures 8, which may for example be circular, six of which (8a-8f) can be seen in FIG. 1. Normally the array will be two-dimensional, although the use of a one-dimensional or linear array also falls within the scope of the invention. The waveguide 6 has an aperture at its end remote from the source 2 having a diameter approximating the operating wavelength of the radiation generated by the source 2. Thus, the radiation from the waveguide 6 spreads out on entry into the box 4 With a solid angle approaching $2\pi$ steradians, so that the end of the waveguide 6 effectively acts as a point source.

Some of the radiation emitted from the end of the waveguide into the box 4 will travel directly to one of the holes 8 but the majority of the radiation will undergo at least one reflection at the internal surface of the box 4 before reaching a hole. The holes 8 each have a diameter approximating to half of the wavelength of the radiation generated by the source 2 and so the radiation emitted from the holes will spread out with a solid angle approaching $2\pi$ steradians. This is shown for example by the wavefronts 10 of the radiation emitted from the hole 8a.

The millimeter-wave radiation can have a coherence length of the order of several tens of millimeters depending on its bandwidth. The dimensions of the box 4 are chosen so that when internal reflections are taken into account the path length differences of radiation travelling between the source and each hole 8 will tend to be equal to or greater than its coherence length, thus ensuring that interference effects from the millimeter-wave radiation emitted by the holes 8 will be insignificant. Also, due to the small size of the holes 8 the radiation emitted from the holes will be non-directional. The side of the box 4 in which the holes 8 are formed itself forms a radiating panel or radiating surface which can be part of a one or two-dimensional array of such radiating panels located at or around an area which requires millimeter-wave illumination.

For satisfactory illumination, preferably all reflections off the surface of the object being observed which are seen by a millimeter-wave imager observing the illuminated scene should originate at an illuminated panel, either directly or via other reflections. Each illuminating panel preferably has a constant average radiation temperature across its surface and will be capable of radiating into a large solid angle. Where the illuminating panel makes use of a plurality of radiating apertures, those apertures should preferably be sufficiently close together that they cannot be resolved by the imaging system when used for imaging an object illuminated by the panel (i.e. the panel has a uniform appearance when viewed as reflected by the object being imaged. The imaging system is not normally focused on the panel itself.) This will ensure that the observed radiation temperature is approximately constant across the surface of the panel. Similarly, gaps between adjacent panels can be accommodated provided they are not resolvable by the imaging system when used to image an object illuminated thereby.

Where a non-portable millimeter-wave source is required, the box 4 could be formed with holes in only one of its sides and the walls, floor and/or ceiling of an indoor area where the imaging is to take place can be at least partially tiled with a plurality of such sides of such boxes. Using an arrangement of such boxes according to the present invention will use significantly less energy than would be required to heat or cool the equivalent area of radar absorbent material.

Where a portable version is required, one or more such boxes with holes formed a suitable number of its sides could be located at or around the area where the imaging is to take place. While the originally intended use of these panels was for indoor locations, they could also be used outside to provide illumination for other passive millimeter wave systems, including those at outdoor locations.

Ideally, the radiation intensity from each aperture has the same value. If it is found that the intensity of radiation is higher from some holes, for example holes closer to the source 2, then partially reflective dielectric could be used to cover these holes, for example the dielectric 16 located over the hole 8a in FIG. 1 which is closest to the source 2. Alternatively or additionally, some absorbing material, such as radar absorbent material, could be fitted over part of the internal or external surface of the box.

The pattern of holes used can be adjusted to make the illumination from the box 4 as uniform as possible, so to produce a more uniform average temperature profile across the surface of the box containing the holes 8. In addition or alternatively, reflecting baffles, dielectrics or absorbers could be located within the box or on the internal surface of the box in order to alter the radiation pattern generated by the box, and/or the primary source location or aperture type may be appropriately adjusted.

Figure 2:
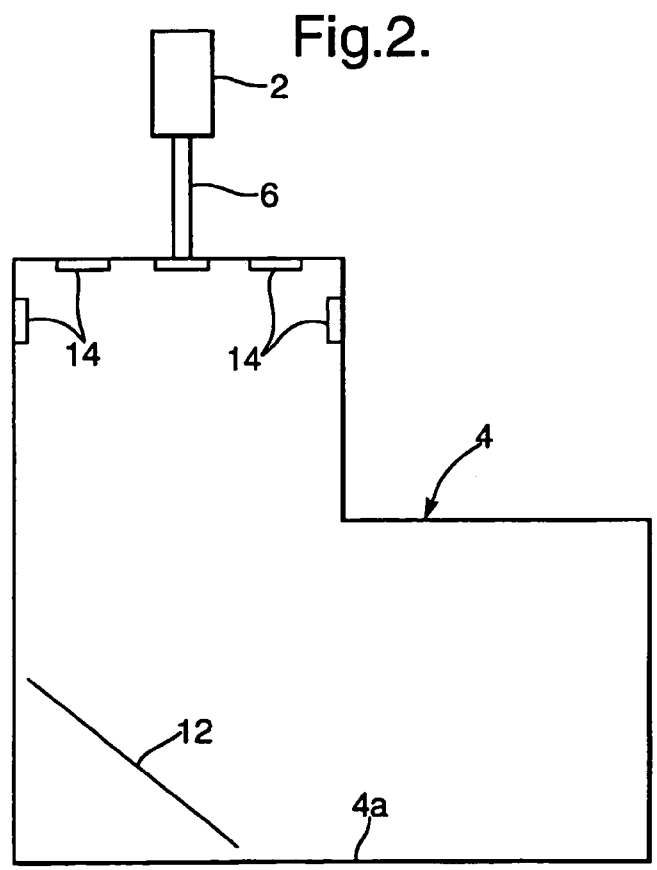
FIG. 2 shows a cross-section of a source for passive millimeter-wave imaging generally similar to that shown in FIG. 1, but with an L-shaped cross-section.

The embodiment of FIG. 2 shows that the box need not be of simple rectangular cross-section. As shown, the box 4 has an L-shaped cross-section with the source 2 and waveguide 6 located at one end of the L and a optionally reflecting baffle 12 located at the bend in the L, but other shapes of box could be employed. Where present the reflecting baffle 12 could have a rough reflecting surface in order to further decrease the coherence of radiation emitted from the box 4. By "rough reflecting surface" is meant a reflecting surface with irregularities on a scale equal to or greater than the wavelength of the radiation. The radiating holes are formed for example in the end 4a of the box 4 where not obscured by the baffle 12. In this embodiment, radar absorbent material absorbing material 14 is fitted over selected areas of the interior of the box to render the outputs of the apertures 8 more uniform.

Figure 3:
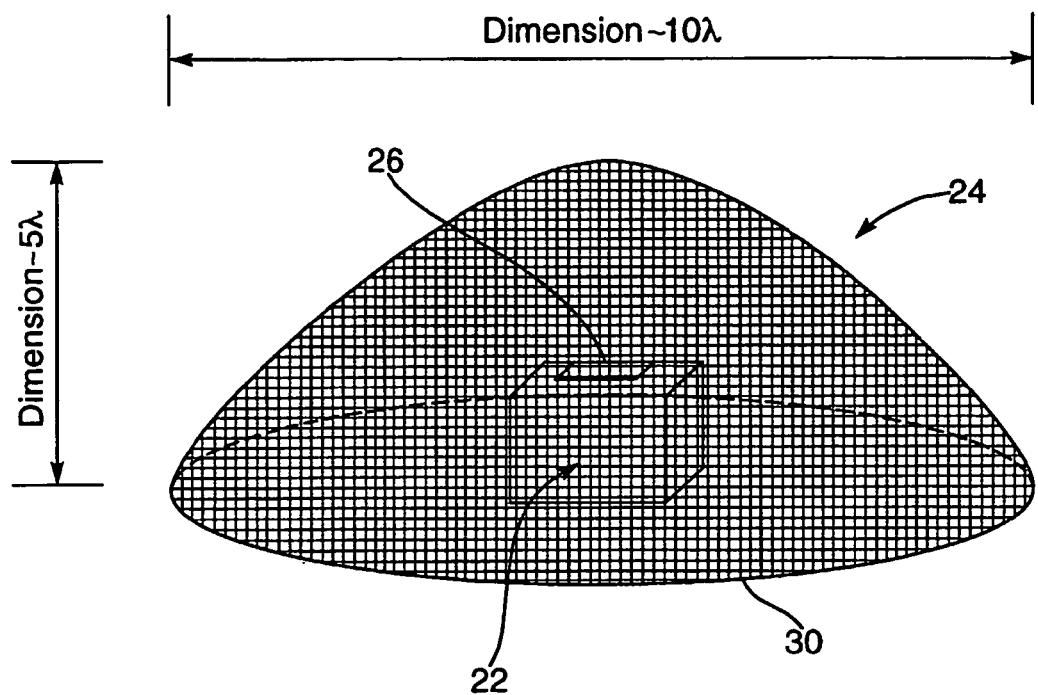
FIG. 3 shows another embodiment of a source for passive millimeter-wave imaging according to the present invention employing a wire mesh.

A further embodiment of the present invention is shown in FIG. 3, in which the illuminating source for indoor passive millimeter-wave imaging comprises a millimeter-wave source 22 and a container in the form of a dome 24 made of mesh which has a flat base 30 with a reflecting upper surface. The source 22 is located at the center of the dome 24 and has an aperture 26 on its upper surface. The size of the aperture 26 is of the order of half of the operating wavelength of the source so that the source radiates over a wide solid angle. The underside of the mesh which forms the dome is reflective and may be formed from reflective metal. The base 30 may also comprise a metal sheet with a reflective upper surface. The spacing of the strips or wires making up the mesh is preferably less than half the operating wavelength of the source 22. Due to this spacing of the strips or wires making up the mesh a large proportion of the radiation will be reflected by the underside of the mesh at least once before it is emitted through the mesh. The spacing of the strips or wires forming the mesh can be used to control the proportion of the radiation reflected from the mesh before it is emitted through the mesh. The architecture of the dome 24 will cause the majority of radiation from the source 22 to be reflected a large number of times within the dome which will destroy the coherence of the radiation from the source. Using a rough reflecting surface as the upper surface of the base 30 or baffles within the dome can further reduce coherence.

Thus the mesh dome 24 radiates as a spatially incoherent source in all directions with a substantially uniform intensity.

Again, however, if necessary, areas of the container may be covered with radar absorbent material, for example on the base 30, and/or selected areas of the mesh may be covered with a partially reflecting dielectric sheet.

It should be noted that the sources of FIGS. 1 to 3 may be arranged to emit both horizontally and vertically polarised radiation. This can be used to further improve contrast in a millimeter-wave imaged scene if images are taken separately using the differently polarised radiation and then processed.

As noted previously, a further desirable feature would be that the radiating surface appears to have the same brightness at all angles of observation, so approximating a black body radiator.

For this to occur, all the individual radiating elements (apertures) would need to have a cos theta radiation pattern, dropping to zero at a 90 degree incidence angle. Such a pattern would cancel out the 1/(cos theta) increase in area, as seen by a beam of constant solid angle, as the angle of observation of a notional infinite surface moves away from normal.

Figure 4:
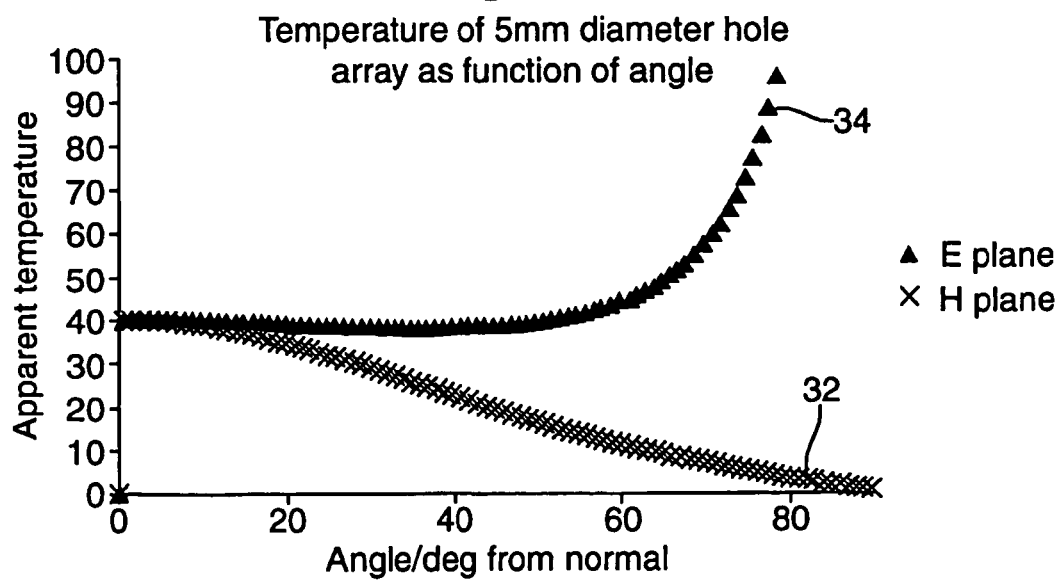
FIG. 4 is a plot of the variation of the observed or apparent temperature (in arbitrary units) of the radiating surface with observation angle for the E and H plane components for an illumination source such as that of FIG. 1.

However, the radiation pattern from circular or rectangular holes does not follow this law, and, indeed, the E and H patterns are not equal, so that the surface will appear to be at different temperatures depending on the observation direction. This is shown in FIG. 4, which is a modeled curve for a circular hole, found to agree closely with experiment. Thus in reality the apparent surface temperature drops with increasing angle in the H plane, curve 32, because the H plane radiation from a circular hole is narrower than the ideal cos theta pattern, but rises in the E plane, curve 34, because the E-plane radiation is wider than the ideal. The ideal behaviour would be the same horizontal line for both E and H plane radiation.

Figure 5:
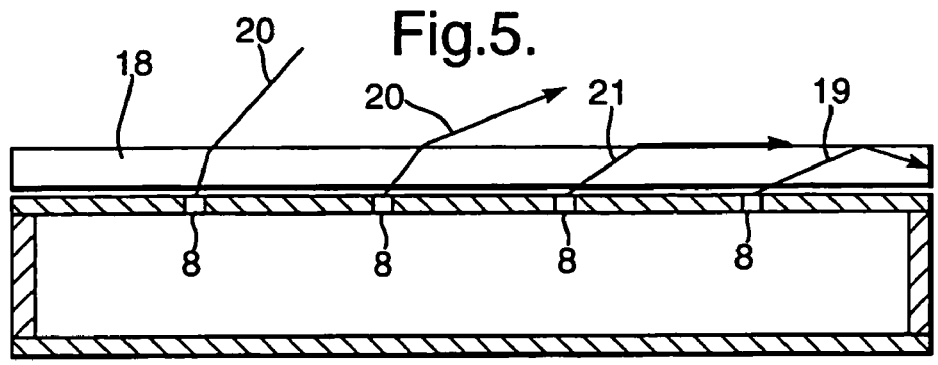
FIG. 5 is a drawing of a container of a modified illumination source according to the invention for explaining the effect of adding a sheet of low loss dielectric material over the radiating apertures.

If low loss dielectric material 18 such as polythene is placed over each aperture 8, FIG. 5, conveniently as a continuous sheet but optionally as individual components for each aperture, the emitted radiation from the aperture will be refracted, bending rays away from the normal. Thus some radiation 19 emitted at a large angle to the panel normal which would have been emitted is now totally internally reflected in the dielectric, and is either passed back into the container 4 or, more probably retained within the dielectric 18 and eventually absorbed or emitted along the edges of the panel or over its entire surface at a different angle to the normal. Radiation 20 that travels through the dielectric sheet at an angle of incidence between its critical angle (ray 21) and its normal is now spread out over the full 90 degree range as it leaves the aperture.

Figure 6:
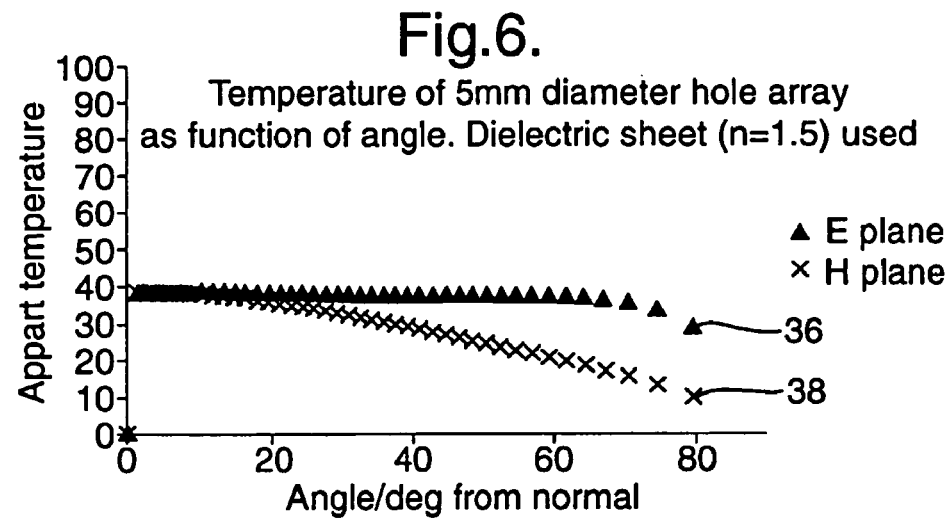
FIG. 6 is a theoretical plot of the variation of the observed or apparent temperature (in arbitrary units) of the radiating surface with observation angle for the E and H plane components for the container of FIG. 5.

The effect on the emitted radiation pattern is shown in FIG. 6, and it will be seen that the E-plane radiation pattern 36 is now very much flatter, and the H pattern 38 is improved, although it still falls with increasing angle.

Figure 7:
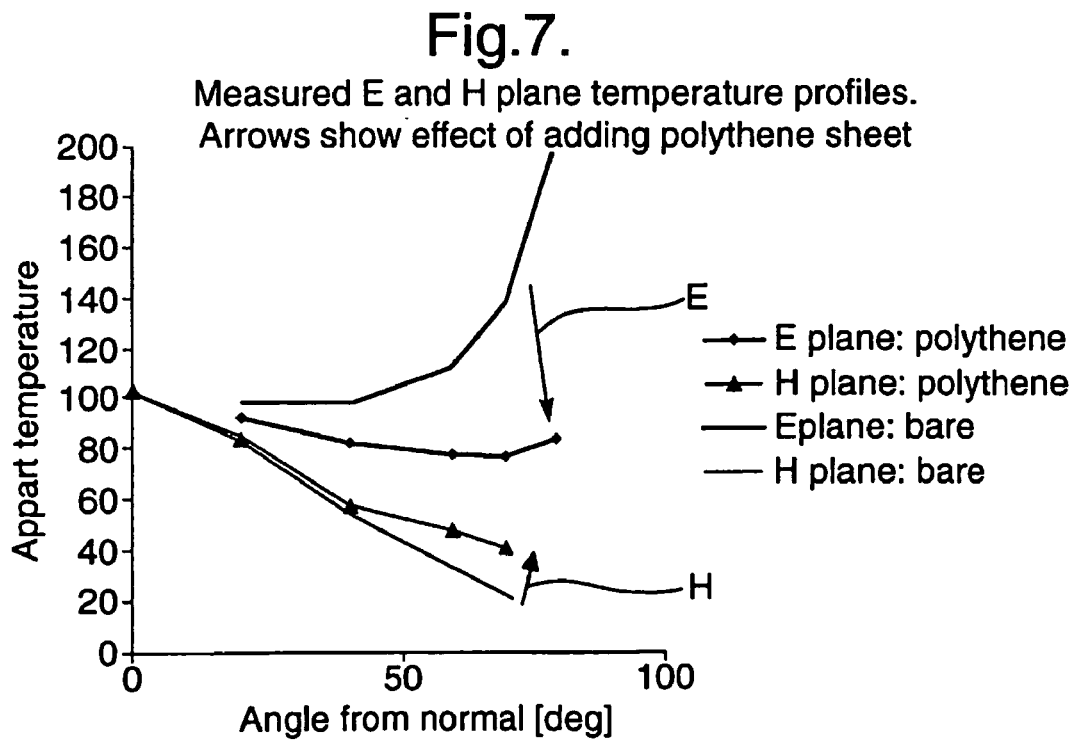
FIG. 7 is a measured plot of the variation of the observed or apparent temperature (in arbitrary units) of the radiating surface with observation angle for the E and H plane components for a container similar to that of FIG. 5.

A similar effect is shown in FIG. 7 for a panel with 5 mm diameter holes on a 50 mm square pitch. The arrows E and H respectively indicate the effect on the apparent or observed temperatures of the E and H components on adding a 10 mm thick polythene sheet to the surface.

Figure 8:
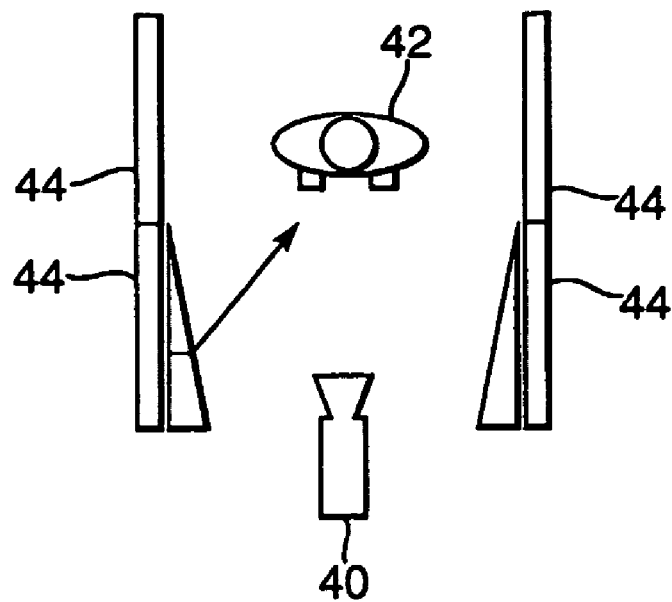
FIG. 8 shows in schematic form a first imaging system incorporating a plurality of illumination sources according to the invention.

FIG. 8 shows an imaging arrangement comprising a millimeter-wave camera 40 for viewing a subject 42 in a local imaging region between opposed rectilinear lines of illumination sources 44 according to the invention. Although the sources could be used without any modification, as shown the sources more remote from the subject are provided with dielectric wedges on their radiating surfaces so as to deflect by refraction the radiation closer to the subject.

Figure 9:
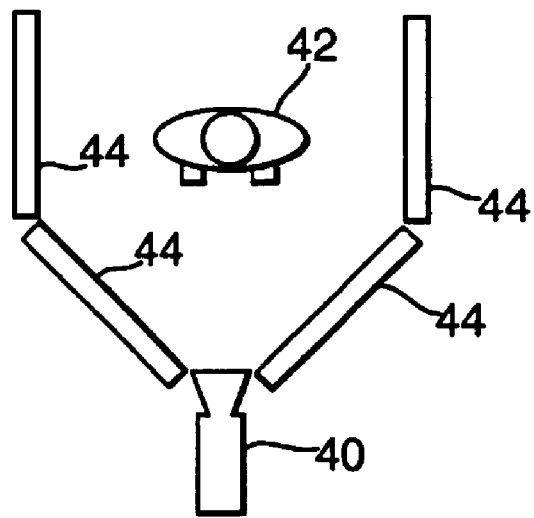
FIG. 9 shows in schematic form a second imaging system incorporating a plurality of illumination sources according to the invention.

FIG. 9 shows an alternative imaging arrangement in which the more remote sources 44 are inclined relative to the closer sources so that the normal to the radiating surface of each source is generally directed towards the subject. Naturally, both a geometrical arrangement such as in FIG. 9 and beam deflection for example as in FIG. 8 may be employed conjointly to obtain the optimum illumination of the subject.

Where there is a plurality of sources 44, they may be arranged to be individually or separately controlled, for example to turn on each one, or each group of sources, independently of each other. This will alter the radiation pattern received by the subject, and may show up 'shadowing' effects of objects and provide useful additional information.

It should be noted that, especially if a panel is being reflected in something as well as directly illuminating a person or object, the principal radiating direction may not be the direction of the person or object. Similarly, where as in FIG. 9 there is a plurality of relatively inclined sources, they may alternatively be arranged so that their principal radiating directions converge at a locality which is not coincident with the position of the object.

Although FIGS. 8 and 9 show a plurality of sources 44, a single source could be used in some instances. Whether there is one source, or a plurality, the pattern of radiation at the subject may be further adjusted or controlled by providing one or more additional reflectors external to the source(s), such as a mirror or diffuser.

A panel may be strengthened (e.g. for standing on) by using dielectric or metal materials within it, without adversely affecting its performance.

The invention claimed is:

1. An illumination source of incoherent millimeter-wave radiation for illuminating an area for passive millimeter-wave imaging comprising a container with at least a part of its interior formed from reflective material and having a plurality of exit apertures; and a primary source of millimeter-wave radiation for emitting millimeter-wave radiation into the container via at least one exit port wherein an exit port associated with the primary source is adapted to direct at least some of the radiation towards at least a first reflective surface that is itself arranged to reflect at least some of the radiation towards a second reflective surface or second region of the first reflective surface, the exit apertures allowing radiation to escape from the container.

2. An illumination source according to claim 1 wherein said at least two paths differ by more than the coherence length of said radiation.

3. An illumination source according to claim 1 wherein the radiation has a bandwidth of at least 1 GHz.

4. An illumination source according to claim 1 wherein a portion of the radiation is not reflected before being emitted through the apertures.

5. An illumination source according to claim 1 wherein the majority of the millimeter-wave radiation emitted by the primary source undergoes reflection within the container before being emitted through the apertures.

6. An illumination source according to claim 1 wherein at least one reflective baffle is located within the container.

7. An illumination source according to claim 1 wherein at least one region of millimeter-wave absorbing material is located within the container.

8. An illumination source according to claim 1 wherein at least one of the exit apertures is covered by a partially reflective dielectric element.

9. An illumination source according to claim 1 wherein the primary source is substantially a point source.

10. An illumination source according to claim 1 wherein the source is coupled to the container by a waveguide.

11. An illumination source according to claim 1 wherein the source is located within the container.

12. An illumination source according to claim 1 wherein the container is a box.

13. An illumination source according to claim 1 wherein at least part of the container is formed from a mesh and the plurality of apertures are formed by the holes in the mesh.

14. An illumination source according to claim 13 wherein the container comprises a dome of mesh located over a base having a reflective upper surface.

15. An illumination source according to claim 13 wherein the mesh is made from metal wire.

16. An illumination source according to claim 1 wherein the apertures have a width approximating to half the operating wavelength of the illumination source.

17. An illumination source according to claim 1 wherein a low loss dielectric material is located at or immediately adjacent the apertures to intercept radiation passing through the apertures.

18. An illumination source according to claim 17 wherein the low loss dielectric material is in the form of a sheet on a surface of the container incorporating the apertures.

19. An illumination source according to claim 17 wherein the low loss dielectric material has a non-uniform thickness to control the direction of the radiation leaving the apertures.

20. An imaging arrangement comprising a millimeter-wave imager for imaging a local region and at least one illumination source according to claim 1 arranged for illuminating said region.

21. An imaging arrangement according to claim 20 and including a plurality of said sources.

22. An arrangement according to claim 21 wherein the sources have a preferred principal radiation direction and are arranged so that their principal radiating directions converge.

23. An imaging arrangement according to claim 20 and including means for selectively controlling one or more said sources whereby to alter the radiation pattern received at said local region.

24. An arrangement according to claim 20 and also including at least one passive millimeter-wave reflector for altering the pattern of radiation received by the said local region from the said source.

25. An arrangement according to claim 24 wherein said passive device is a mirror or diffuser.

26. An illumination source of incoherent millimeter-wave radiation for illuminating an area for passive millimeter-wave imaging comprising a container with at least a part of its interior formed from reflective material and having a plurality of exit apertures; and a primary source of millimeter-wave radiation for emitting millimeter-wave radiation with a bandwidth of at least 1 GHz into the container via at least one exit port wherein an exit port associated with the primary source is adapted to direct at least some of the radiation towards at least a first reflective surface formed from the reflective material, the exit apertures allowing radiation to escape from the container.

27. An illumination source according to claim 26 wherein at least one of the exit apertures is covered by a partially reflective dielectric element.

28. An illumination source according to claim 26 wherein the apertures have a width approximating to half the operating wavelength of the illumination source.

29. An illumination source according to claim 26 wherein a low loss dielectric material is located at or immediately adjacent the apertures to intercept radiation passing through the apertures.

30. An illumination source according to claim 29 wherein the low loss dielectric material is in the form of a sheet on a surface of the container incorporating the apertures.

31. An illumination source according to claim 30 wherein the low loss dielectric material has a non-uniform thickness to control the direction of the radiation leaving the apertures.

* * * * *